Sept. 11, 1951 A. RINGO 2,567,859
ELECTRIC RANGE TESTER AND ANALYZER
Filed Feb. 21, 1946
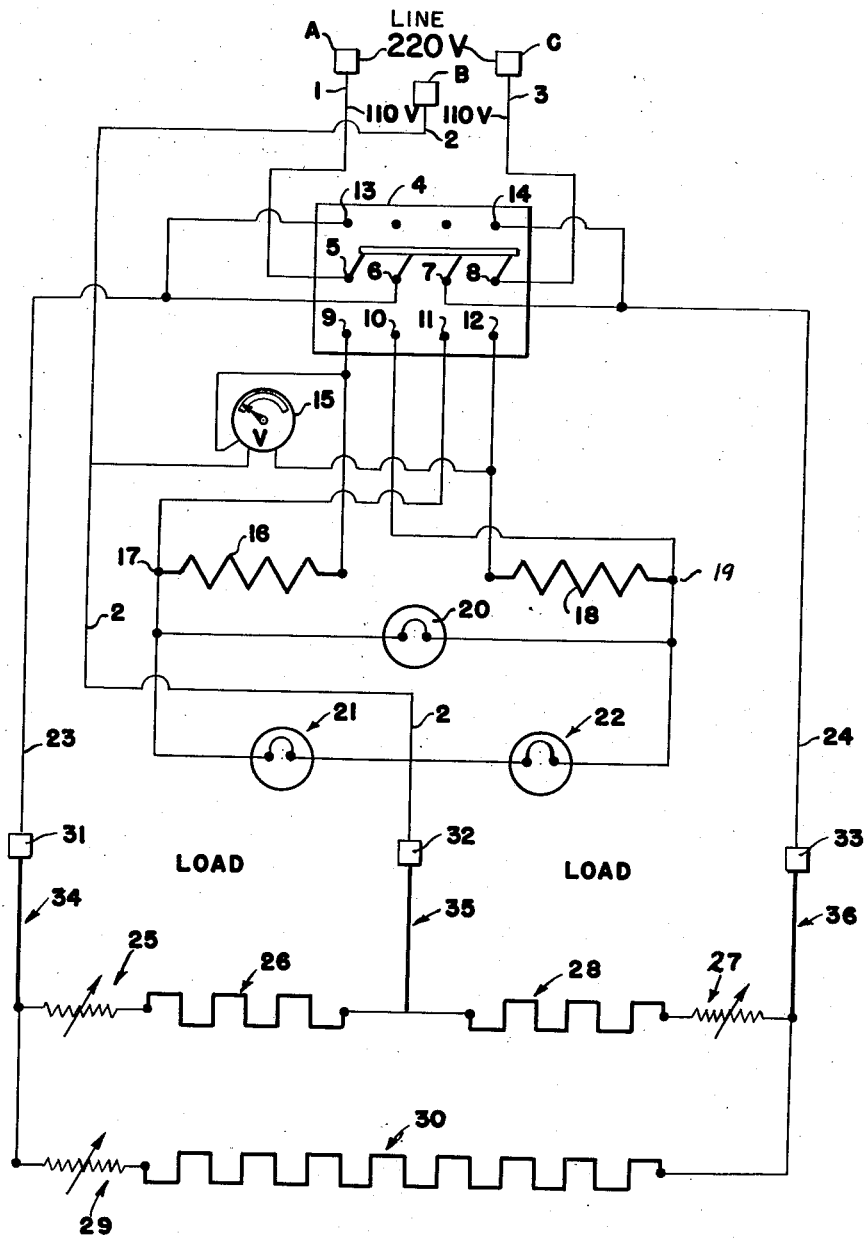
INVENTOR.
Atlee Ringo
BY
Jerome W. Paxton Patented Sept. 11, 1951

2,567,859

UNITED STATES PATENT OFFICE 2,567,859

ELECTRIC RANGE TESTER AND ANALYZER

Atlee Ringo, Bloomington, Ill.

Application February 21, 1946, Serial No. 649,256

2 Claims. (Cl. 175—183)

My invention relates to a system and apparatus for testing the condition of the supply circuits and cable and heating elements of an electric range or other electric load, and for readily obtaining a visual indication of the condition of such elements and the nature of any existing defects as grounds, open circuits or short circuits.

An object of my invention is to provide a testing apparatus for displaying an indication of the condition of the circuit elements and connections of an electric range or other electrical load.

Another object of my invention is to provide a testing apparatus which is suitable for use with a three wire 110-220 volt supply system and load, and will selectively display signals indicating the nature of circuit defects and whether such defects are located in the 110 volt or 220 volt elements.

With these and other objects in view which will be apparent from the following specification, my invention consists in the parts and circuit elements and connecting circuits hereinafter described, with reference to the accompanying sole figure which is a schematic showing of the circuit elements and connections.

My invention employs three different incandescent electric lights which by their degree of brilliance or darkness give an indication of circuit conditions.

While testing apparatus has been heretofore described for testing electric range performance, no such prior apparatus has provided means for readily obtaining a visual indication which immediately shows the nature and location of any existing circuit defect in the manner which can be obtained with the apparatus of my invention.

Referring to the drawing, there is shown an electric range or other electric load having heating elements 26 and 28 adapted for supply by 110 volts, and a heating element 30 adapted for supply by 220 volts. The range has supply terminals 34, 35, 36, usually assembled as the range supply cable, which will normally form a plug adapted to be plugged into a line receptacle having contact elements A, B, C, connected respectively to a three-wire 110-220 volt supply line.

My testing apparatus has a plug comprising terminals 1, 2, 3, which are respectively plugged into line receptacle elements A, B, C, and my testing apparatus has receptacle elements 31, 32, 33, in which the plug elements 34, 35, 36 of the range are respectively plugged. To apply my testing apparatus, the range plug 34, 35, 36, is pulled out of its normal attachment to receptacle elements A, B, C, and my testing apparatus is inserted therebetween.

A four-pole double-throw switch 4 has its blade terminals 5 and 8 respectively connected to the outside terminals 1, 3, of the 110-220 volt supply.

Stud contacts 9 and 12 on one side of this switch are respectively connected through current limiting resistors 16 and 18 to inner terminals 11 and 10 of the same side of the switch. The inner blade terminals of the switch are respectively connected by leads 23 and 24 to tester receptacle elements 31 and 33. Neutral supply terminal 2 is connected to the tester receptacle neutral element 32.

The range heater element 26, which may be a top plate, and is adapted to operate on 110 volts, has its connection between terminals 34 and 35 controlled by switch or variable resistor 25.

Similarly, 110 volt top plate element 28 has its connection between terminals 35 and 36 controlled by switch or variable resistor 27.

The range heater element 30, which may be an oven element, is adapted to operate on 220 volts and has its connection between terminals 34 and 36 controlled by switch or variable resistor 29.

A 25 watt 110 volt incandescent electric lamp 21 is connected between neutral wire 2 and the terminal 17 of resistor 16 which is remote from stud contact 9 of switch 4, which stud 9 is connectable to supply terminal 1.

Similarly a 25 watt 110 volt incandescent electric lamp 22 is connected between neutral wire 2 and the terminal 19 of resistor 18 which is remote from stud contact 12 which is connectable by switch 4 to supply terminal 3.

A 50 watt, 220 volt incandescent electric lamp 20 is connected between the terminals 17 and 19 of resistors 16 and 18 which are remote from switch stud contacts 9 and 12.

For operation on a 110-220 volt three-wire circuit, a suitable value for current limiting resistors 16 and 18 is about 16 ohms.

The back stud contacts 13 and 14 of switch 4 are connected respectively to load leads 23 and 24, so that when switch 4 is thrown to the back position, the line terminals 1 and 3 are respectively connected to the load terminals 31 and 33, so that the load current does not pass through the testing apparatus.

When the switch 4 is thrown to the front position, the testing apparatus is inserted between the supply terminals and load terminals, and gives visual indications of the condition of the heating elements of the range and its connections.

A voltmeter 15 of suitable type and scales is connected to switch front stud terminals 9 and 12 and also to neutral 2.

Instead of incandescent electric lamps 20, 21, 22, I may use electric measuring or indicating instruments of known types to give quantitative indications of the magnitude of voltage thereacross, and I may use in connection therewith variable resistors having setting dials graduated to correspond to various circuit conditions.

In use, the range supply cable 34, 35, 36, is unplugged from line terminals A, B, C, and tester receptacles 31, 32, 33, and tester connections 1, 2, 3, are respectively connected thereto, to insert the tester between line and range or other load.

All range load switches 25, 27, 29, are opened. Switch 4 is thrown into the front position, connecting lines 1 and 3 to resistors 16 and 18 and their connected lamps 20, 21, 22.

If there are no grounds or short-circuits in the range supply cable connections 34, 35, 36, and these connections are all clear, the three lamps 20, 21, 22 are all bright. If there is a ground on one side of the 110 volt wiring circuit, the 110 volt lamp 21 or 22 on that side will go out. If there is a short circuit on the 220 volt wiring circuit, the 220 volt lamp 20 will go out.

If the all clear indication has been shown as above for the range cable, one of the 110 volt heating units as 26 is slowly turned on by turning variable resistor 25, and if the heater unit is all right, the corresponding lamp as 21 will gradually go dimmer but will not entirely go out. If there is a short or a ground in the resistor 25 or heater unit 26, the lamp 21 will go out. If in a given position of rheostat 25, there is a bad connection or flash over, the lamp will go out on that position. If there is a flickering of the lamp as 21 on any position of the rheostat 25, there is a loose connection or defective contactor in the rheostat, and each rheostat contact should be separately inspected.

To test the 220 volt or oven heating unit 30 and rheostat 29, turn 110 volt unit rheostats 25 and 27 to off, all three lights will be bright. Turn oven or 220 volt rheostat 29 slowly on, the 220 volt lamp 20 will slowly dim down and will get dimmer as the rheostat is turned if the heating element and connections are all right. If there is an open circuit, the lamp 20 will stay bright.

If there is a short circuit in the oven wiring, the lamp 20 will go out. If the lamp 20 flickers, there is a bad contact in the rheostat 29 or heating element 30, and the rheostat and element should be inspected separately.

If the 220 volt or oven circuits as well as the 110 volt top plate circuits all test all right, the switch 4 may be thrown to the back position, taking the tester out of circuit and connecting lines 1 and 3 directly to range terminals 34 and 36. The oven can then be tested to see if it comes up to rated temperature for a given setting of rheostat 29, since it will not come up to proper temperature when the tester is in the circuit with its series resistors.

My testing and analyzing apparatus gives a definite and readily understandable indication of the condition of the circuits of a range or other load, and is simple and rugged to use. It eliminates blowing fuses and guess work in locating various kinds of circuit troubles, as grounds, short circuits, loose connections, bad switches, contacts flashing, over open circuits, wrong connections on switches and heating units or other load elements, and any such defect can be located immediately.

The tester of my invention is simple and rugged in construction and dependable in operation, and markedly improves the grade of service which the consumer obtains from his electric range or other electric load device.

It will be obvious to those skilled in the art that my invention is susceptible of modifications and adaptations to meet particular conditions, and all such modifications which are within the scope of the appended claims I consider to be comprehended within the spirit of my invention.

I claim:

1. In a testing appliance for testing circuit conditions in an electrical range supplied by a three-wire supply line having a neutral conductor between the two outer conductors and provided with at least a pair of electrical load elements respectively connected between the neutral conductor of the load circuit and the two outer conductors of load circuit, including switch means to respectively connect the conductors of the supply line to the corresponding conductors of the load circuit, a pair of electrically actuated visual indicating devices connected between the neutral conductor of the load circuit and points on each of the load conductors adjacent to the switch means, and a pair of resistors respectively connected in the two outer conductors of the load circuit between the switch means and the points of connection of said visual indicating means, whereby actuation of the switch means will give a visual indication of the condition of the load elements and the load conductors beyond said points of connection.

2. In a testing appliance for testing circuit conditions in an electrical range supplied by a three-wire supply line having a neutral conductor between the two outer conductors and provided with a pair of electrical load elements respectively connected between the neutral conductor of the load circuit and the two outer conductors of the load circuit, and another load element connected between the two outer load conductors including switch means to connect respectively the conductors of the supply line to the corresponding conductors of the load circuit, a pair of electrically actuated visual indicating devices connected between the neutral conductor of the load circuit and points on each of said outer load conductors adjacent to the switch means, a third electrically actuated visual indicating device connected between said outer load conductors at points adjacent to said switch means, and a pair of resistors respectively connected in the two outer conductors of the load circuit between the switch means and the points of connection of said visual indicating means whereby actuation of the switch means will give a visual indication of the condition of the load elements and of the load conductors beyond said connecting points.

ATLEE RINGO.

REFERENCES CITED

The following references are of record in the file of this patent:

UNITED STATES PATENTS

| Number | Name | Date |
|---|---|---|
| 675,158 | Hubbard | May 28, 1901 |
| 1,314,218 | Rodrigues | Aug. 26, 1919 |
| 1,969,713 | Bullock | Aug. 14, 1934 |
| 2,061,487 | Scott | Nov. 17, 1936 |
| 2,151,782 | Lockwood | Mar. 28, 1939 |
| 2,354,888 | Smith | Aug. 1, 1944 |